United States Patent
Baumoel

(10) Patent No.: US 10,222,247 B2
(45) Date of Patent: Mar. 5, 2019

(54) MULTIPHASE ULTRASONIC FLOW METER

(71) Applicant: Joseph Baumoel, Wellington, FL (US)

(72) Inventor: Joseph Baumoel, Wellington, FL (US)

( * ) Notice: Subject to any disclaimer, the term of this patent is extended or adjusted under 35 U.S.C. 154(b) by 41 days.

(21) Appl. No.: 15/444,790

(22) Filed: Feb. 28, 2017

(65) Prior Publication Data
US 2018/0010941 A1 Jan. 11, 2018

Related U.S. Application Data

(60) Provisional application No. 62/359,319, filed on Jul. 7, 2016.

(51) Int. Cl.
*G01F 1/66* (2006.01)
*G01F 1/74* (2006.01)

(52) U.S. Cl.
CPC .............. *G01F 1/667* (2013.01); *G01F 1/662* (2013.01); *G01F 1/74* (2013.01)

(58) Field of Classification Search
CPC .............. G01F 1/74; G01F 1/66; G01N 29/02
See application file for complete search history.

(56) References Cited

U.S. PATENT DOCUMENTS

| | | | | |
|---|---|---|---|---|
| 4,397,190 A | * | 8/1983 | Hulin | G01F 1/34 73/152.29 |
| 4,841,780 A | | 6/1989 | Inada et al. | |
| 4,882,928 A | * | 11/1989 | Lane, Jr. | G01N 29/032 340/632 |
| 5,929,342 A | * | 7/1999 | Thompson | G01F 1/64 73/861.04 |
| 6,405,603 B1 | * | 6/2002 | Baumoel | G01F 1/74 73/592 |
| 6,587,796 B2 | | 7/2003 | Fukuhara | |
| 8,694,270 B2 | * | 4/2014 | Huang | G01F 1/667 702/48 |
| 9,052,230 B2 | * | 6/2015 | Kutlik | G01H 3/125 |
| 9,625,305 B2 | * | 4/2017 | Schaefer | G01F 25/0007 |
| 9,746,360 B2 | * | 8/2017 | DeSilva | G01F 1/66 |
| 9,880,133 B1 | * | 1/2018 | Stephanou | G01N 29/04 |

(Continued)

OTHER PUBLICATIONS

International Search Report dated Sep. 13, 2017 in the Corresponding PCT International Appln. No. PCT/US2017/041096.

*Primary Examiner* — Jewel V Dowtin
(74) *Attorney, Agent, or Firm* — F. Chau & Associates, LLC

(57) ABSTRACT

A Holographic Multiphase Flowmeter permits reconstructing the type, size and distribution of Objects within a Multiphase Medium by analysis of the ultrasonic energy reflected from these Objects. If this Multiphase Medium is flowing through a pipe into which a preferred mode of ultrasonic energy is injected at a Reference location, and the amplitude of reflections from the current multiphase Objects at that location and the time it took after the last transmission for that reflected signal amplitude to arrive at the Receive transducer are recorded, it is possible to determine the velocity of the medium by measuring the travel time taken for these same Objects to arrive at a known distance downstream by correlating the same type of reflection data at this second Correlation location. Analysis of this data permits displaying type and size of the Objects in a graphic image showing their distribution within the liquid in real time.

24 Claims, 12 Drawing Sheets

(56) References Cited

U.S. PATENT DOCUMENTS

2002/0134140 A1 9/2002 Baumoel
2008/0163700 A1 7/2008 Huang
2010/0251829 A1 10/2010 Davis
2010/0299088 A1 11/2010 Huang et al.
2013/0167655 A1 7/2013 Fujii et al.
2015/0160052 A1 6/2015 Wiest et al.

* cited by examiner

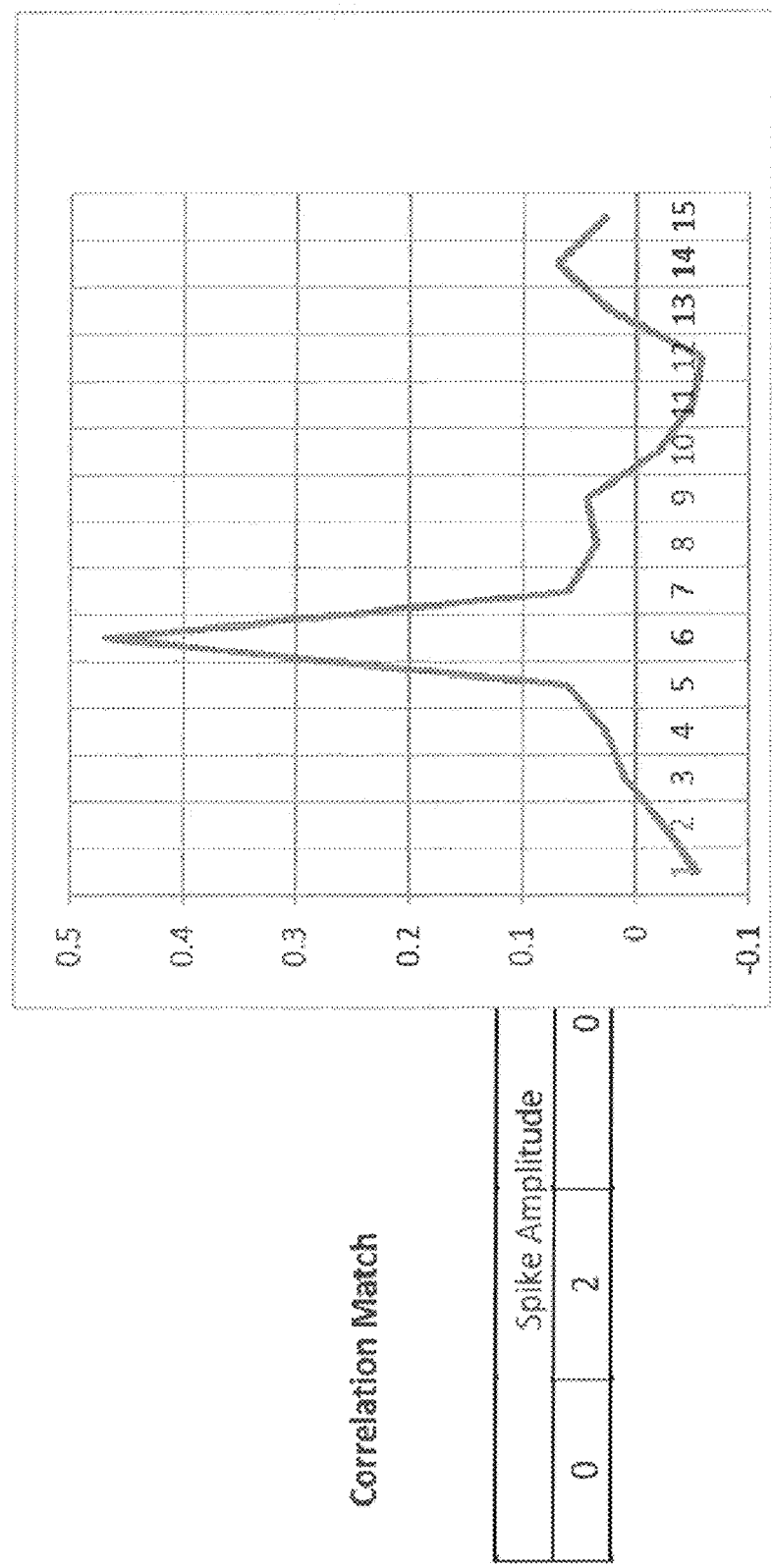

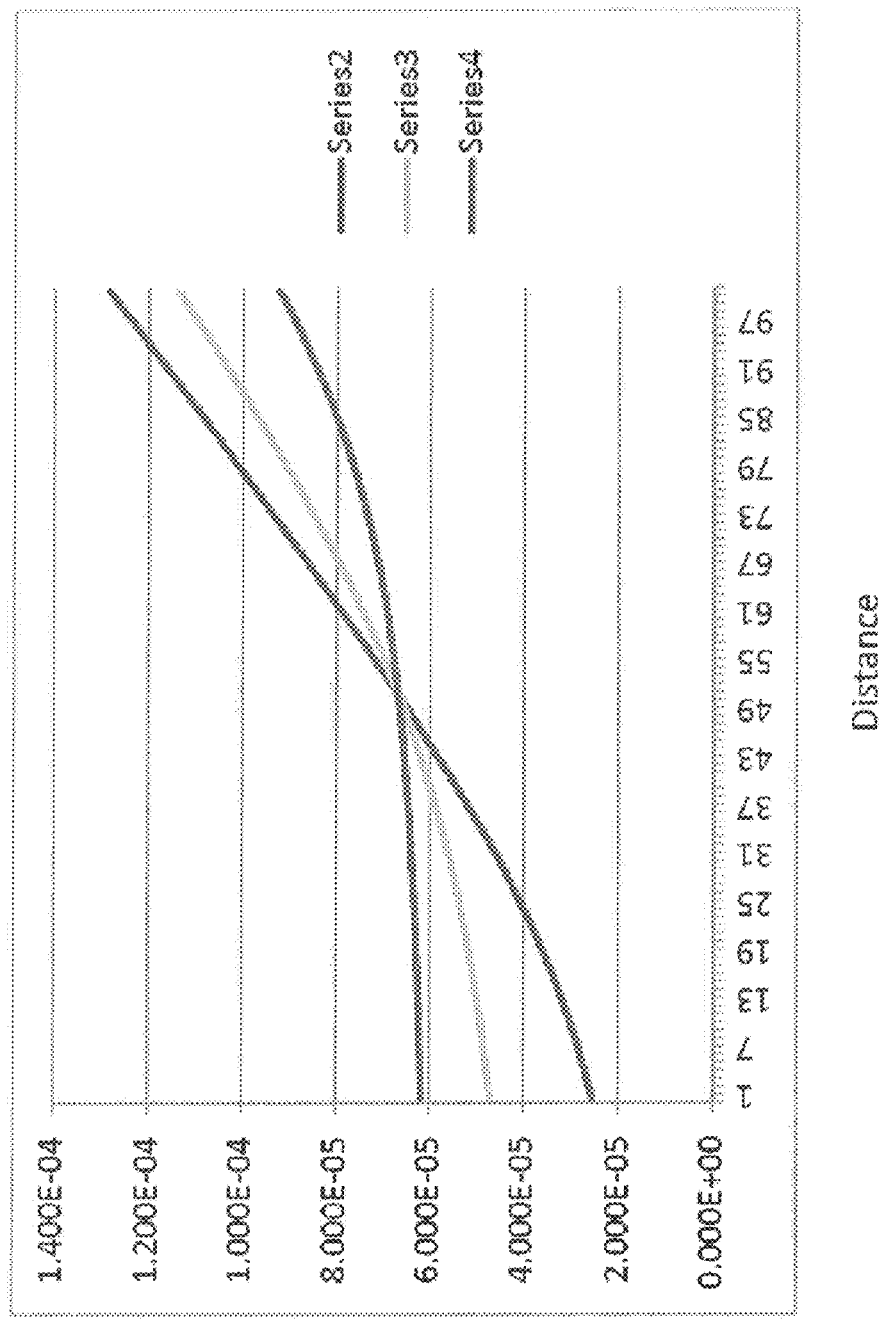

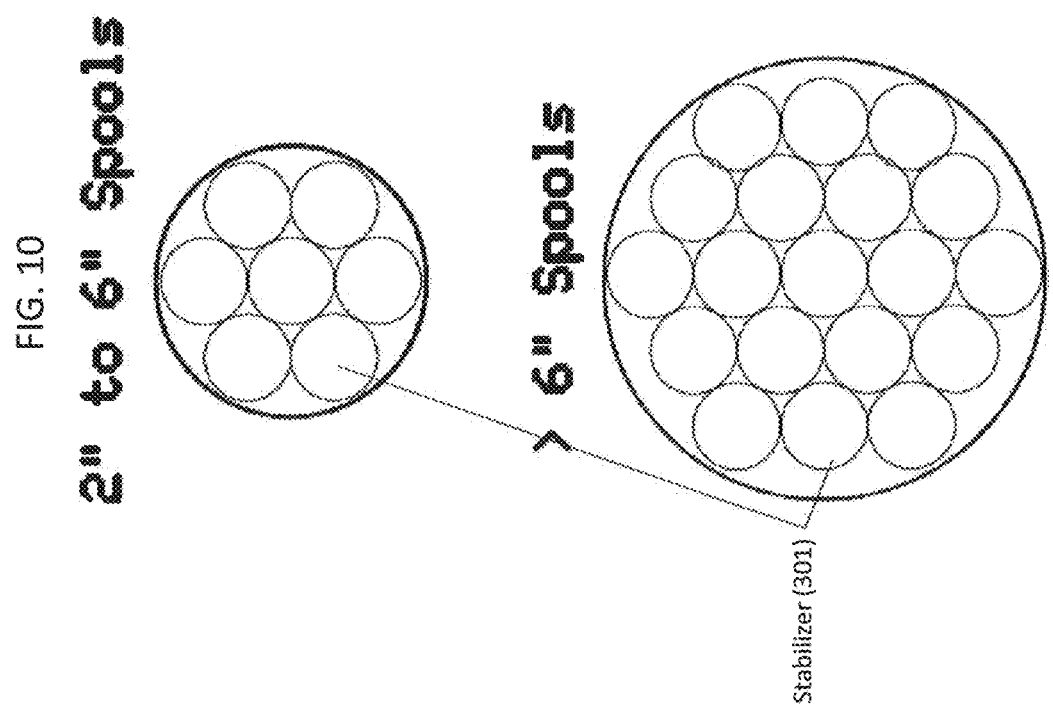

MULTIPHASE ULTRASONIC FLOW METER

CROSS-REFERENCE TO RELATED APPLICATIONS

This application claims priority to U.S. Provisional Application No. 62/359,319, filed on Jul. 7, 2016 the disclosure of which is incorporated by reference herein.

TECHNICAL FIELD

The present disclosure relates to an ultrasonic flow meter, and more particularly to a multiphase ultrasonic flow meter.

SUMMARY OF THE INVENTION

Holography can be used to reconstruct an image from which light waves were reflected and recorded. The Holographic Multiphase Flowmeter (HMF) permits reconstructing the type, size and distribution of Objects within a Multiphase Medium by analysis of the ultrasonic energy reflected from these Objects. If this Multiphase Medium is flowing through a pipe into which a preferred mode of ultrasonic energy is injected at a Reference location, and the amplitude of reflections from the current multiphase Objects at that location are recorded, it is possible to determine the velocity of the medium by measuring the travel time taken for these same Objects to arrive at a known distance downstream by correlating the same type of reflection data at this second Correlation location. Analysis of this data also permits displaying the type and size of the Objects, in a graphic image showing their physical distribution within the flowing liquid, in real time. It is also possible to apply this technology to industrial applications where determining the type, size and distribution of Multiphase within a container, as used in chemical, food and related processing applications, is desired.

In an embodiment, an Ultrasonic Transducer (Transceiver) that injects a sonic beam normally through a pipe or container wall that travels diametrically, and which will cause ultrasonic reflections from Objects in the beam path that differ in sonic impedance from the primary medium in the pipe or container.

In an embodiment, a plurality of the ultrasonic transducers are installed on the exterior of a pipe or container in diametrically opposite pairs.

In an embodiment, the ultrasonic transducer acts as a Transmitter/Receiver of direct transmission from a diametrically opposite Transducer, or a Receiver of reflected ultrasonic energy.

In an embodiment, an electronic device is provided that consists of an Ultrasonic Transmitter, at least four pairs of Ultrasonic Transceivers installed on the exterior of a Pipe or Container, each of which sequentially acts as a Transmitter, with the others acting as a Receiver of Direct or Reflected ultrasonic energy from an Object (a bubble of Water or Gas) entrained in a Medium of Oil (or any other combination of fluids), plus an equal number of gain controlled amplifiers, an equal number of A/D converters, and sufficient Memory to record a sufficient amount of digital data to enable fulfillment of all functions.

In an embodiment, a means is provided for distributing the electronic elements to permit local Transmit and Receive functions to be provided within the structure of each Mounting Track (e.g., referred to hereinafter as a transducer module), with digital data collection and operating control to reside in one of the several Mounting Tracks.

In an embodiment, a reference memory is provided to store the ultrasonic signal amplitudes received by a plurality of successive Transmit/Receive events.

In an embodiment, a means is provided for interpreting the relative amplitudes of the data representing the amplitude of the Reflected or Directly received ultrasonic energy to determine the nature of the Objects, as to being Oil, Gas or Water.

In an embodiment, a means is provided for relating the arrival time of the reflected ultrasonic energy to determine the location of the Object from which the reflection came, within the Pipe or Container.

In an embodiment, a means is provided for processing the stored signal amplitude data to enable re-constructing and displaying a fixed plane or 3D image of the distribution of Objects in the path of a transmitted Ultrasonic beam which reflected or blocked ultrasonic energy, as detected by the Transducers mounted on the exterior of the pipe or container.

In an embodiment, the ultrasonic flowmeter described above is duplicated and located at a known distance D, downstream from a Reference location on a pipe, and a means is provided for determining, by Correlation of the memorized Reference data to the Correlation data collected at the downstream site, to determine by mathematical Correlation the real time T taken for the upstream Objects to arrive at the Correlation site, by which the Medium flow rate can be computed, as D/T.

In an embodiment, a means is provided for constraining the diversion of the path of Objects due to flow turbulence in the region between the Reference and Correlation sites to enhance Correlation strength when confronted by Single Phase fluid conditions.

In an embodiment, a means is provided for determining the shape of the Flow Profile by analysis of the comparative Central Object location at the Reference and Correlation sites, as compared to the Average Object location.

In an embodiment, a means is provided for separately performing Correlation using Reflect data only, and then Direct transmission data only.

In an embodiment, a means is provided for strengthening Correlation by enhancing higher valued Reflect data in preference to lower valued data.

In an embodiment, a means is provided for strengthening correlation by using absolute data amplitude as a multiplier of Correlation Strength to determine Best Match.

In an embodiment, a means is provided for correlating individual Path data and accepting selection of "Best Correlation" by a voting system among the Paths.

In an embodiment, a means is provided for correlating various combinations of Reference Path data against similar combinations of Correlation Path data representing substantial improvement of Signal to Noise ratios in correlation data.

In an embodiment, a means is provided for enhancing correlation data by enhancement based on amplitude of Received sonic signals.

BRIEF DESCRIPTION OF THE DRAWINGS

An exemplary embodiment of the Holographic Multiphase Flowmeter is typified by the construction shown in the drawings described below, with the understanding that the minimum number of Transducer Modules is 4, but as many more sets of 2 modules may be provided as may be determined by application conditions. Further descriptions of these drawings are embodied in the texts following the list.

FIG. 7C shows typical Processed Correlation Results Showing a Correlation Match;

FIG. 8 shows a typical Relationship between Object Location and Path Reflection Arrival Time;

FIG. 10 shows a typical Flow Profile and Object Pattern Stabilizer Construction.

Figure 1:
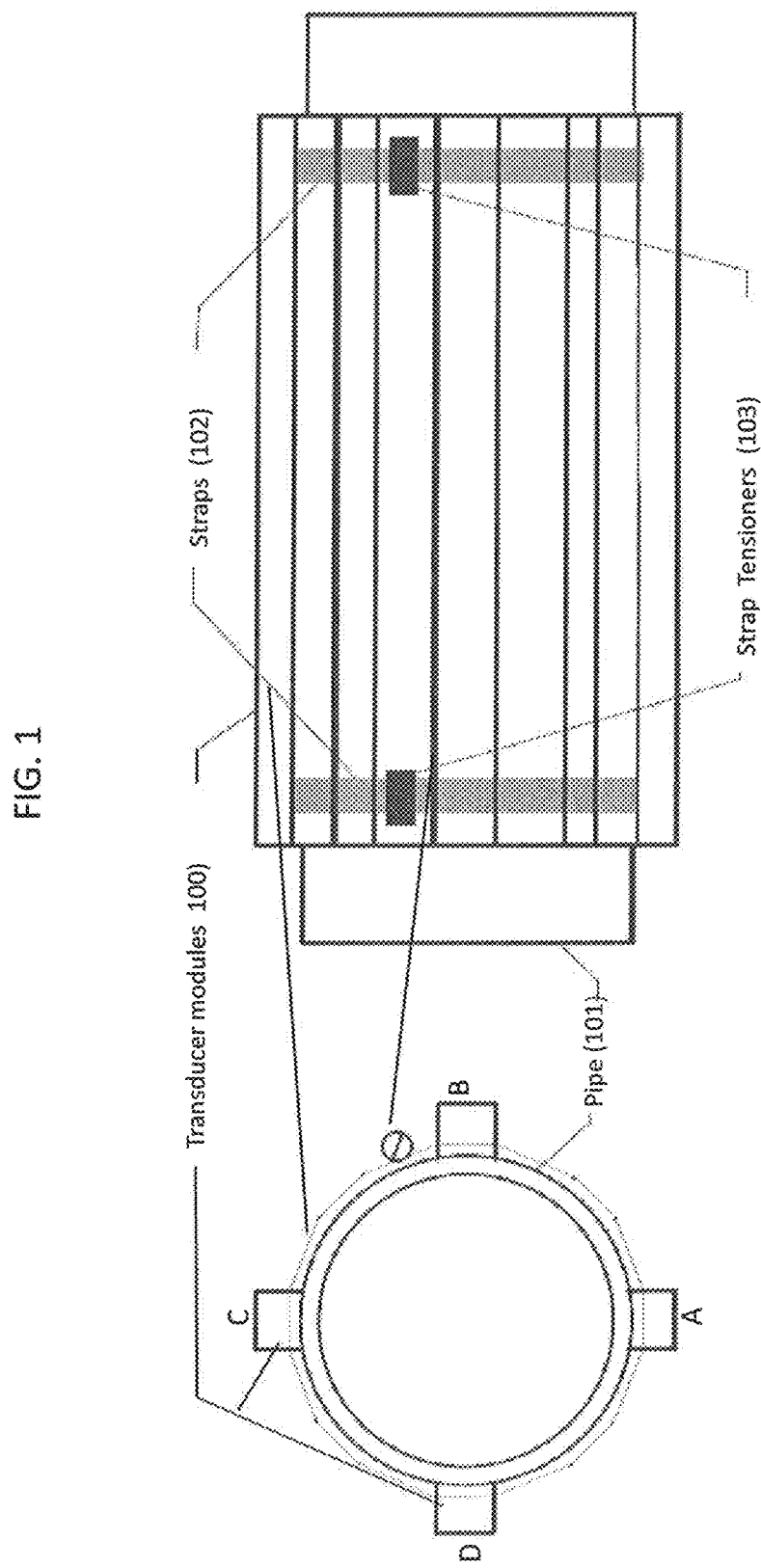
FIG. 1 shows a Set of Four Transducer Modules Clamped to the Exterior of a Pipe Section.

DETAILED DESCRIPTION 1.0 Definitions a. Definition of Multiphase Ultrasonic Flowmetering A Multiphase ultrasonic flowmeter is charged with measuring the flow rate of hydrocarbon products, (or other mixed components), under chaotic conditions where the components of the flowing medium are of indeterminate type, relative quantity and distribution. In addition to flow rate, it is usually desired to also determine the types, relative quantity and physical distribution of the components.

Typical of the applications of a Multiphase flowmeter is its use in the Oil and Gas industry, especially at the wellhead or pipeline distribution system, where the data may have use in maximizing production or distribution of crude oil, which may include various percentages of free gas. Applications also exist in general industrial chemical and related processing, not always requiring measurement of flow rate.

In the context of Ultrasonic Flowmetering, it is intended to inject ultrasonic energy, of preferred frequencies and amplitude, and obtain the desired information by analysis of the received ultrasonic energy (signals) from transducers in strategically placed locations on the pipe or container in which the medium is either located or flowing.

b. Definition of the Multiphase Medium

A multiphase condition, by definition, is one in which the medium is composed of identifiably different liquid, gas and possibly solid components, dispersed randomly, and of arbitrary component size and shape. Dependent on application, it is possible to identify a range of component chemistry, characteristics and ratio of components that may be of interest in determining, as well as the rate of change of medium characteristics over time or process conditions.

2. Characteristics of Ultrasound Applicable to Fulfillment of Holographic Multiphase Flowmetering a. Identifying the Primary Medium The speed of sound, Vs, in a medium, M, is related to its physical properties, at a given temperature, T, and pressure, P. By creating a direct path between any Ultrasonic Transmitter, and a diametrically opposite Receiver, at a known distance (inside diameter) apart, computation of the sonic velocity, Vs, of the primary medium from the arrival time of the direct signal is readily apparent. The measured Vs is also readily used to differentiate, say, Oil from Water.

b. Relationship of Detectable Object Size to Sonic Impedance and Ultrasonic Wavelength Ultrasonic energy will reflect off a boundary formed between an Object in Media of different Sonic Impedance, Zs. It is also well known that the magnitude of this reflection is secondarily dependent on the relative size of a component embedded within a large component, and to the wavelength of the ultrasound beam in the larger component.

c. Identifying Multiphase Components

The sonic impedance, Zs, of gas is much lower than that of any liquid. Therefore, the ultrasonic beam reflection from a gas bubble will be much greater than that from a liquid bubble in a liquid Medium. Also, the sonic impedance of water is somewhat different from Oil which permits identifying any embedded liquid of a different type by the existence of a detectable Reflection.

d. Measurement of Flow Rate

Physical distribution of Objects in a viscous Multiphase medium is somewhat resistant to change, and will only change gradually with time as the medium is subjected to physical disturbance, as would be the case as the Medium may flow, as in a pipe. Therefore it is possible to correlate the ultrasonic reflection data obtained at Site A, with that obtained later at Site B, a known distance downstream from Site A. This permits computation of Flow Velocity as a function of the time difference between generation of an Object's Reference data at Site A, and the same Objects correlation data obtainable on its arrival at Site, as $Vf=D/t$, where Vf is flow rate, D=distance between Reference and Correlation sites, and t is the time taken for data taken at the Reference site to be detected at the Correlation site.

Under conditions of Fully Developed Flow, the shape of the Flow Profile does not affect the accuracy of flow rate measured by the technology described above. But, in conditions where the profile is still evolving, a change in velocity of any segment of the measurement could introduce a small error. However, since the data collected at the Reference and Correlation sites reveals where in the diameter of the pipe that the data originated, it is possible to measure and define any skew in the flow profile between Reference and Correlation sites, and thereby correct the flow rate computations to correct for such error.

e. Measurement of Flow Rate for Turbulent Low Viscosity Liquids

In applications in which measurement of flow rate is necessary even during periods of low viscosity and high turbulence it is possible that a recognizable Object Reflection Signature may not be preserved over the distance between Reference and Correlation sites sufficient to support flow rate measurement by Correlation, and where the device supplied is in the form of a Spool, rather than a Field Clamp-On model, it is possible to equip the Spool with an internal Tube Bundle to confine the Signature artifacts to a similar location in the pipe at both sites.

Turbulent and Single Phase flow conditions tend to contravene use of the Correlation method to obtain Reference and Correlation data needed to compute flow rate. This type of application often creates Correlatable data based on the differential liquid density caused by turbulence, which changes Vs in accordance with the distribution of pressure waves in the pipe. In such cases, confining these pressure variations may enhance Flow Rate measurement to the range of Single Phase media.

f. Location of Multiphase Objects by Detection of Arrival Time

Figure 6:
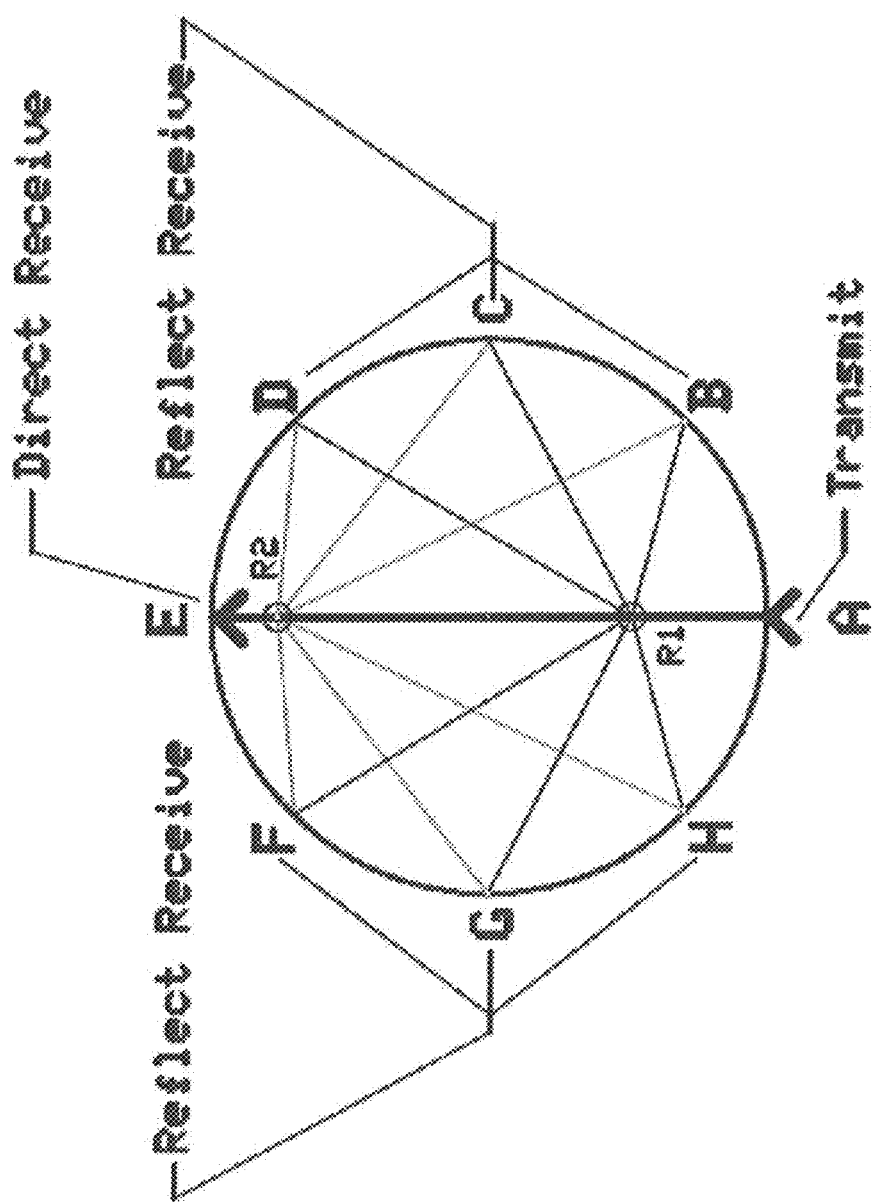
FIG. 6 shows Direct and Reflected Ultrasonic Paths for an 8 Module System.

The sonic propagation velocity of the Medium can be determined from the measured transit time of an ultrasonic transmission received at a known distance from the transmitter, as in passage across the known inside diameter of a pipe. Therefore, this time sets the distance scale for any other reflection and may be used to locate the position of any Object within a pipe or container. i.e., total distance from a Transmitter to the Object, and from the Object to the Receiver equals Vs, the Medium, sonic propagation velocity and the measured time, t. Using the known dimensions of the Transducer locations permits computation of the exact location of the Object within the pipe or container. FIG. 6 shows all possible reflection locations for all transducers which can receive Reflections from Objects.

g. Measurement of Object Size

In a typical application, a pipe diameter of, say, 4 inches, the arrival time of a signal crossing the pipe is less than 100 microseconds. Accordingly, it is possible to interrogate all 8 paths by sequentially using each of the 8 Transducers as the Transmitter, in a typical embodiment of the Multiphase Flowmeter in less than 1 millisecond. Accordingly, an object whose reflection appears at a particular location for, say, 10 milliseconds, embodied in a medium flowing at a rate of, say, 10 feet per second, must be around 0.1 foot, or 1.2 inches, long. It would be reasonable to assume that the object is as round as it is long, and therefore to conclude that the object has the size of a 1.2 inch diameter sphere is not unreasonable. Testing of typical samples may resolve a proportionality factor which itself may be dependent on flow rate or other well known considerations. Since Objects can be located as to their position within the pipe dimensions, it is possible to Correlate not only their Group velocity, but also the relative velocity of subgroups located at various distances from the center of the pipe. This directly reveals the shape of the flow profile, regardless of its symmetry or distortion. This result permits enhanced flow velocity computation accuracy. A variety of other means of Object size computation will be developed as experience is gained in the use of this technology.

h. Object Imaging

Using the above noted size and location identification of all objects, in real-time, and their Type identification as to Water, Gas or Oil, it is possible to construct a continuous image of the pipe's contents as they pass either of the Reference or Correlation locations. This information is suitable to construct an image of the contents in these cross section locations on the pipe, and color them appropriately to display a moving image of the contents on a computer screen.

i. Clamp-on Multiphase Flowmetering

It is clear from the proposed construction of the Multiphase Ultrasonic Flowmeter that the Transducers can be readily clamped to the exterior of an existing pipe, in the field or in a Spool for installation in a pipeline, thus facilitating a Field Installed Multiphase Ultrasonic Flowmeter.

3. Basic Holographic Multiphase Ultrasonic Flowmeter Design

An embodiment of the instrument which fulfills the functions noted above surrounds the Pipe or container with Transducers which sequentially act as the Transmitter of Ultrasonic energy, utilizing those Transducers not currently transmitting as Receivers of the sonic energy reflected from Objects that the transmitted sonic encountered. By completing this sequential circuit in a time so short, say 1 millisecond, the Objects are essentially frozen in location, so that the data obtained on the magnitude and time of the many Reflections obtained during this Reference Scan can be used to reconstruct the actual location, size and type of all Objects present during the Scan, allowing computation of the percentage of each multiphase component. In addition, measuring the time taken for these current Objects to travel the known distance to a second Correlation site where an identical process is used to detect their arrival by correlating the Reference Scan data with the newly detected Correlation Scan data. This is essentially a Sonic Hologram.

FIG. 1 shows a Set of Four Transducer Modules Clamped to the Exterior of a Pipe Section. Transducer Modules 100 are shown clamped to a section of pipe 101 in opposition array by Straps 102 (e.g., steel) tightened by Tensioners 103.

The first of the modules is labeled as A, the second of the modules is labeled as B, the third of the modules is labeled as C, and the fourth of the modules is labeled as D. The transducer modules 100 are arranged in pairs. For example, the first ultrasonic transducer module (A) faces (opposes) the third ultrasonic transducer module (C), and the second ultrasonic module (B) faces (opposes) the fourth ultrasonic transducer module (D). In an embodiment, the ultrasonic transducer modules 100 are disposed 90 degrees apart from one another around the circumference of the pipe 101. The ultrasonic transducers modules 100 form a band around the pipe 101. In an embodiment, the strap tensioner 103 is implemented using a screw.

Figure 2:
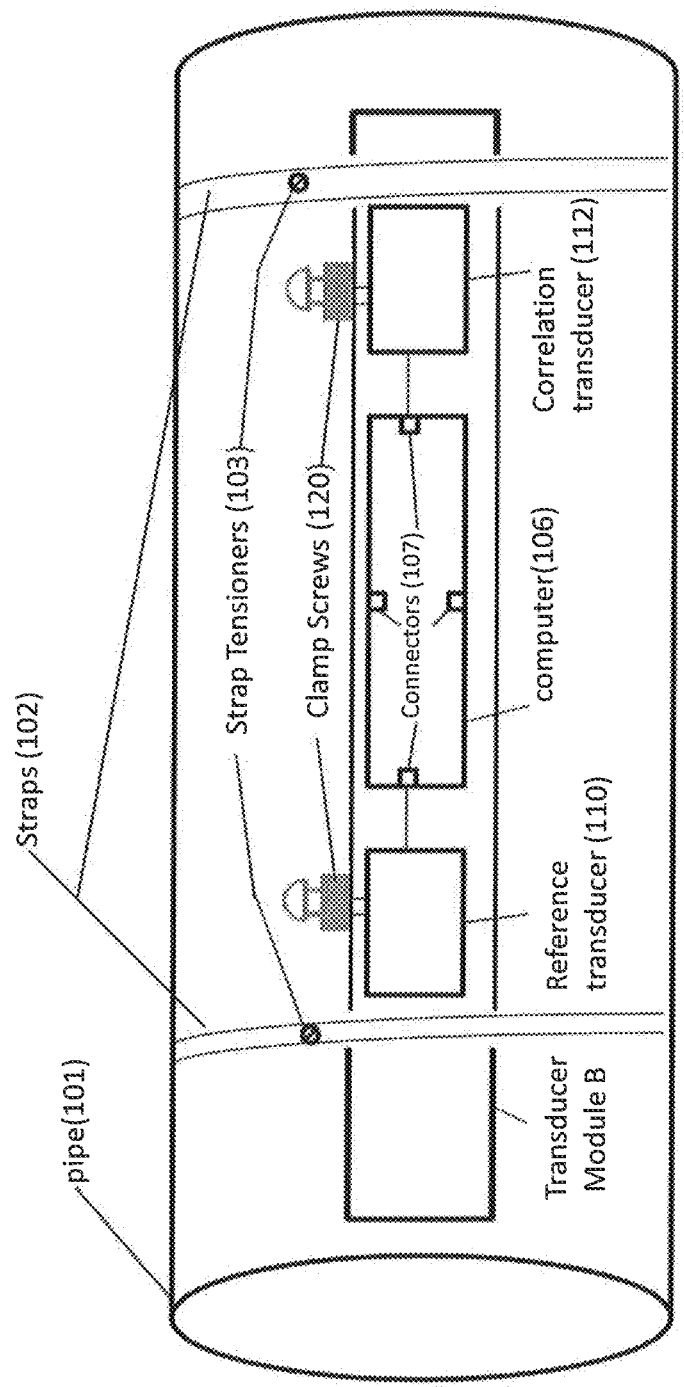
FIG. 2 shows Internal Detail of a Transducer Module Showing Reference and Correlation Transducers.

FIG. 2 shows Internal Detail of a Transducer Module Showing Reference and Correlation Transducers. FIG. 2 shows the Reference 110 and Correlation 112 Transducers spaced at a controlled distance between them, within a Mounting track which accommodates the Mounting Straps 102 with Tensioners 103. The Mounting Track supports the Clamp Screws 120 which clamp the Transducers against the Pipe 101.

The transducer module B includes a reference transducer 110 (e.g., an upstream transducer), a correlation transducer 112 (e.g., a downstream transducer), and a computer 106, which is connected to the transducers 110 and 112 via connectors 107. In an embodiment, clamping screws 120 apply downward pressure on the transducers (e.g., 110 and 112) to secure them on the pipe 101. The other transducer modules A, C, and D may be identical to the transducer module B of FIG. 2, and at the very least include the reference and correlation transducers 110 and 112.

In an embodiment, the reference transducer 110 and the correlation transducer 112 are implemented by a piezoelectric element such as a piezoelectric crystal or a piezoelectric ceramic, which are capable of outputting an ultrasonic signal when a voltage or current is applied thereto.

The flowmeter of FIG. 2 consists of a first ring of reference transducers 110 (e.g., 4) and a second ring of correlation transducers 112 (e.g., 4).

In an alternate embodiment, where the measurement of the flow rate is not necessary, only the reference transducers 110 are required, thereby enabling the flow meter to be shorter in length. In this embodiment, the device includes only one ring of transducers.

Figure 3:
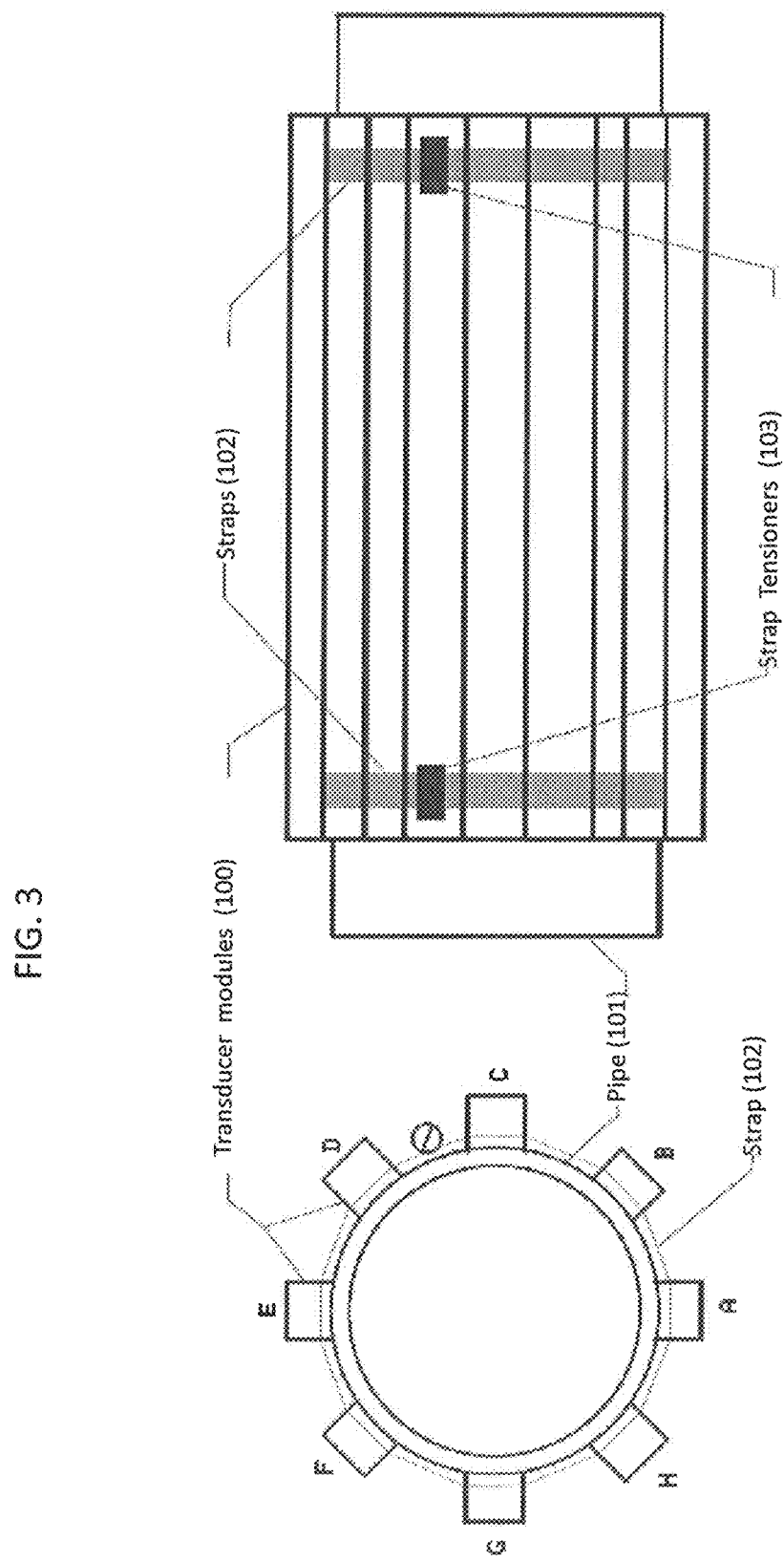
FIG. 3 shows end and side views of an 8 Module Transducer assembly.

FIG. 3 shows an 8 Transducer Module Showing Clamp-On Straps. FIG. 3 shows the end and side views of an 8 Module Transducer assembly revealing the action of the Strap 102 in clamping the Modules 100 to the Pipe 101.

Figure 4:
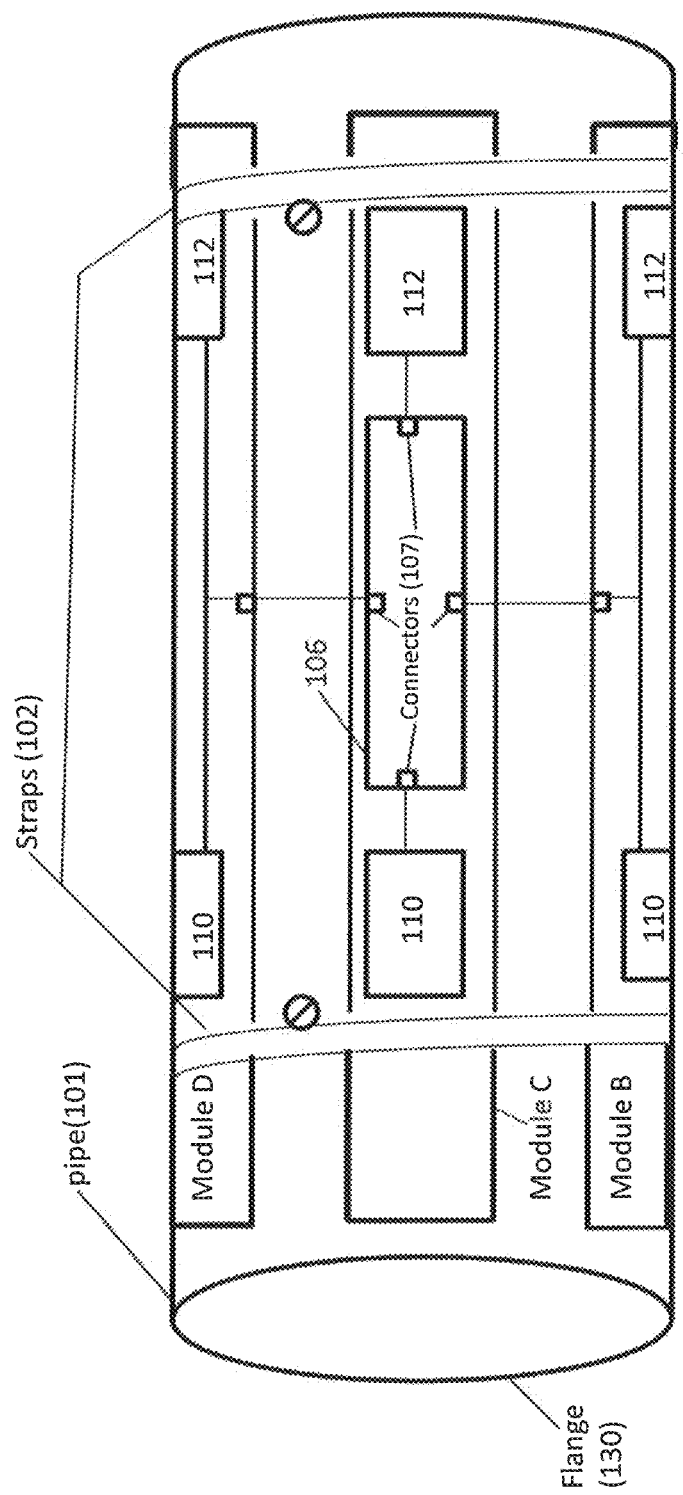
FIG. 4 shows Transducer Modules Including Distributed Transmit/Receive Control.

FIG. 4 shows Transducer Modules Including Distributed Transmit/Receive Control. FIG. 4 shows the Connection Assembly, 106 within which resides a Transmit/Receive circuit which can either control all Transducers 110 and 112 in all Modules or only those on its own module.

For example, in this embodiment, there are a total of eight transducer modules A-E, that are equally spaced apart from one another around the pipe. The transducer modules in this embodiment may be disposed 45 degrees apart from one another around the circumference of the pipe 101. The computer 106 may be connected to a first ring of the upstream transducers (i.e., the reference transducers 110) and a second ring of the downstream transducers (i.e., the correlation transducers 112) in the transducer modules 100. In an embodiment, a flange 130 is affixed to one or both ends of the pipe 101, which enable to the pipe 101 to be mated with an existing pipe.

Figure 5:
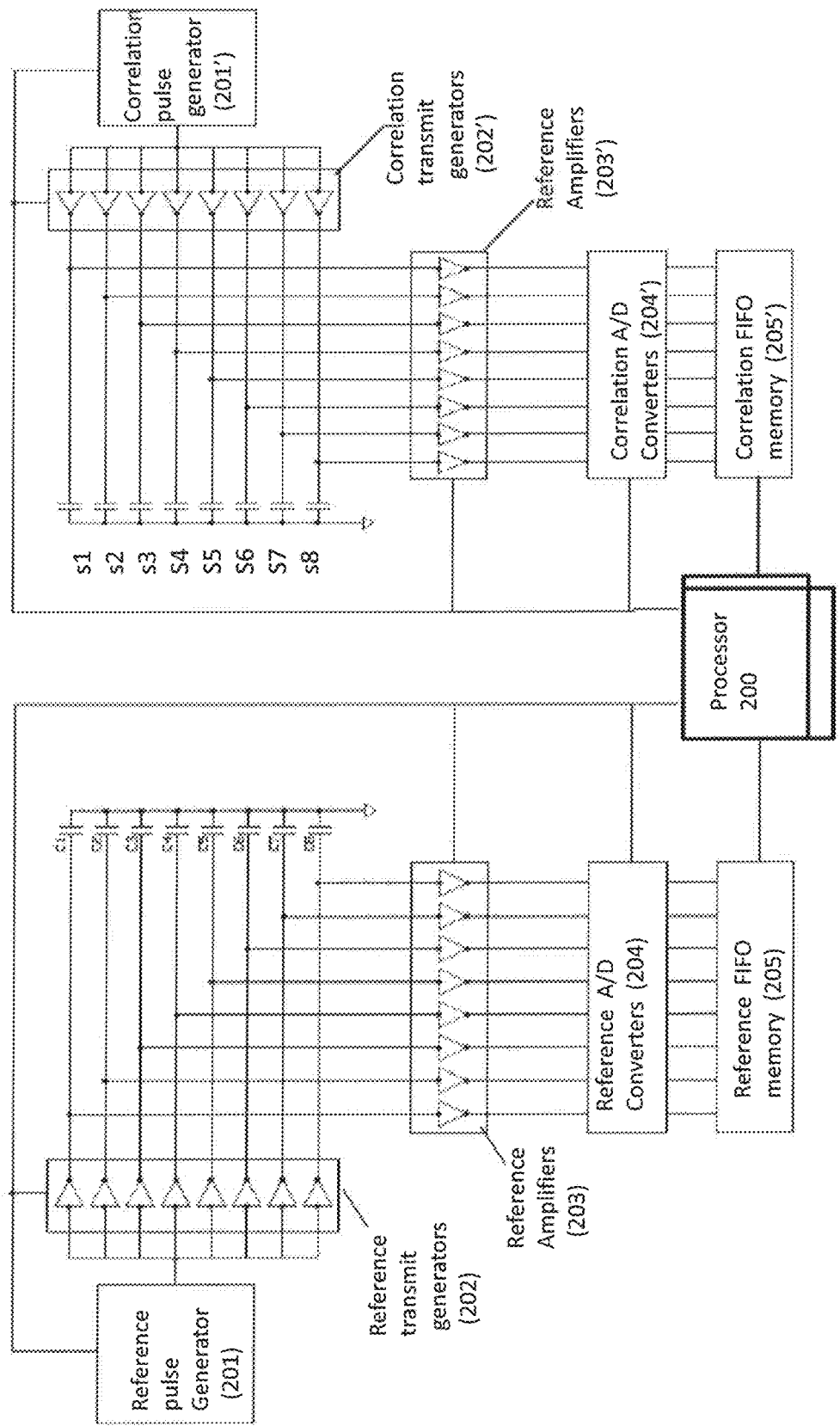
FIG. 5 shows a Reference and Correlation Circuit Block Diagram.

FIG. 5 shows a Reference and Correlation Circuit Block Diagram. This shows the Block Diagram for an 8 Module system, including all subassemblies required for a full function HMF including flow rate detection. Included are Reference and Correlation Pulse Generators 201 and 201, Transmit Generators 202 and 202', Reference and Correlation A/D Converters 203 and 203', Reference and Correlation Memory 205 and 205, and Processor 200.

The processor 200 uses the reference pulse generator 201 and the reference transmit generators 202 to sequentially activate only one of the reference transducers c1-c8 at a time over the course of a first period. The processor 200 activates the first reference transmit generator 202 and deactivates the rest of the reference transmit generators 202 and the pulse signal generated by the reference pulse generator 201 is thus applied only to the first reference transducer c1. Thus, the first reference transducer c1 outputs an ultrasonic signal to the interior of the pipe, and the remaining reference transducers c2-c8 (i.e., the non-activated ones) act merely as receivers.

One of the remaining reference transducers facing the activated reference transducer may receive the ultrasonic signal directly, while the others may receive reflections of the ultrasonic signal that reflect off the wall of the pipe 101. The processor 200 controls the reference amplifiers 203 to receive (read) amplified direct and reflected ultrasonic signals from the non-activated transducers. Since the first transducer c1 in this example, is acting as the transmitter, the processor 200 may deactivate the first reference amplifier 203 connected to the first transducer c1.

The reference A/D converters 202 convert the analog data received from the reference amplifiers 203 into digital data and output the digital data to a reference first-in-first-out memory 205 as first reference path data.

The process may be repeated with respect to each of the reference transducers. For example, next the second reference transducer c2 acts as the transmitter, and the remaining reference transducers c1 and c3-8 act as the receivers. For example, the processor 200 activates the second reference transducer c2 and reads from the first reference transducer c1 and the third through eighth reference transducers c3-c8 to generate second reference path data that is also stored in the FIFO memory 205. For example, the process may be repeated until third through eighth reference path data are stored.

The analog data output to the reference amplifiers 203 may be depicted on a graph as sinusoidal data with one or more peaks. The digital data output by the reference A/D converters 204 may include amplitude values of the sinusoidal data. Since some of the amplitude values may be negative, in an embodiment, all of the amplitude values are squared, and resulting values are stored as the path data. The path data may be considered a pattern because it includes various different values.

During a second period after the first period, the processor 200 controls the ring of correlation transducers s1-s8 (i.e., the downstream transducers) in a similar manner to the reference transducers c1-c8. For example, the processor 200 activates only the first correlation transducer s1 so that it outputs an ultrasonic signal to an interior of the pipe 101, and the remaining correlation transducers s2-s8 act as receivers, then the processor 101 activates only the second correlation transducer s2 and the remaining correlation transducers s1 and s3-s8 acts as receivers, . . . , and finally the processor activates the last correlation transducer s8, and the remaining correlation transducers s1-s7 act as receivers.

For example, the processor 200 may control the correlation pulse generator 201' and the correlation transmit generators 202' to activate only one of the correlation transducers s1-s8 at a time. The reference amplifiers 203' read and amplify the directly received and reflected ultrasonic signals from the non-activated correlation transducers, and the correlation A/D converters 204' convert the output of the reference amplifiers 203' into a digital data for storage as correlation path data in the correlation FIFO memory 205'.

If the correlation path data correlates well with the reference path data, the flow rate can be calculated using the time the reference path data was calculated, the time the correlation path data was calculated, and the distance between the reference transducers c1-c8 and the correlation transducers.

FIG. 6 shows Direct and Reflected Ultrasonic Paths for an 8 Module System. This figure shows the internal Sonic Paths developed by a Transmission from Transducer A, the Direct Path, AE, and Reflect Paths from Objects in the AE Path which are directed to Transducers B, C, D, F, G and H.

FIG. 7 shows a Typical Reference and Correlation Data Difference. This figure shows the difference between the Reference and Correlation data values which is typically sequentially presented to the Correlation Detector, where the S/B ratio is less than 1, with both random and systematic noise components in each data set.

Figure 7A:
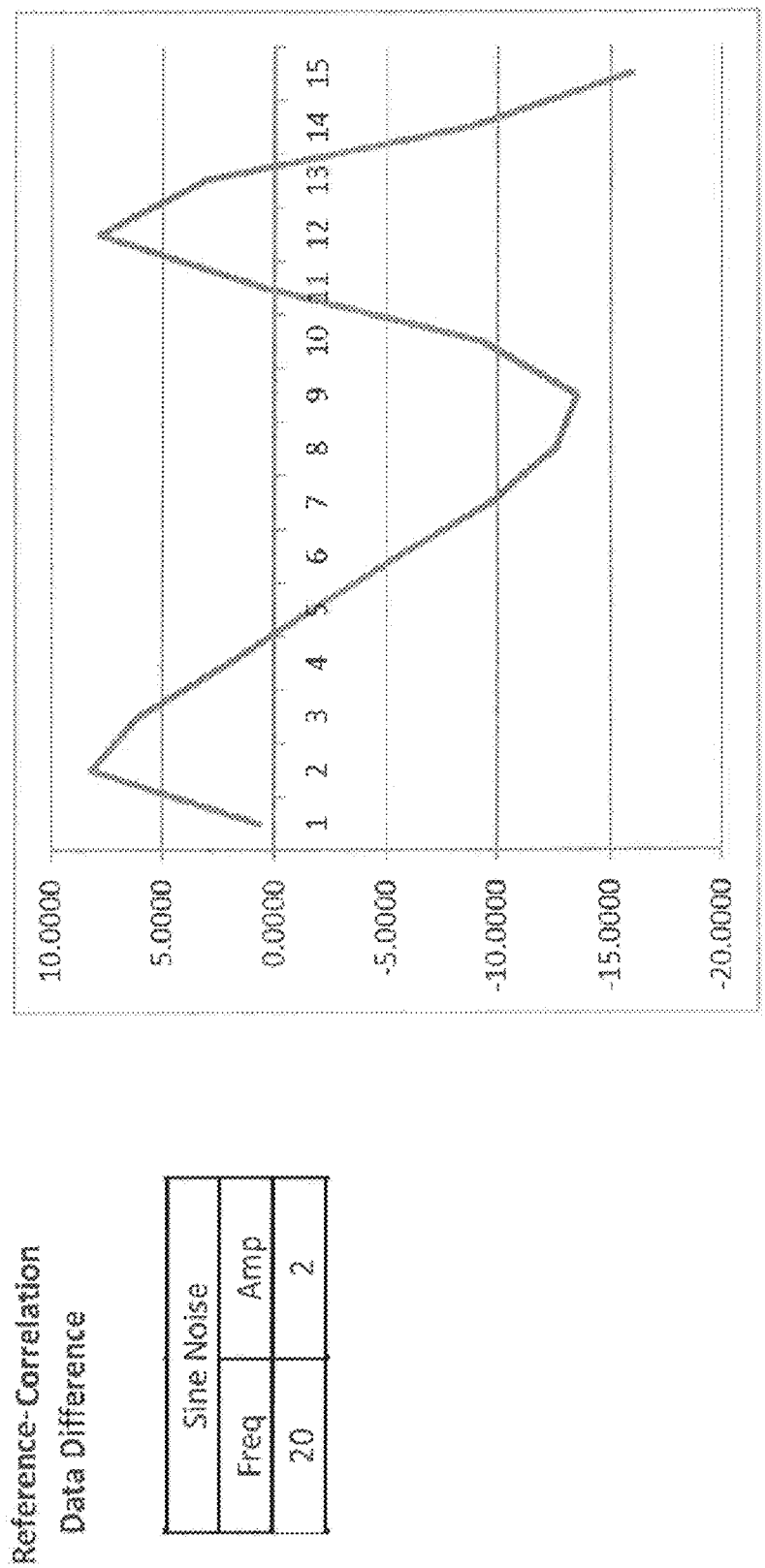
FIG. 7A shows a typical Reference and Correlation Data Difference.
Figure 7B:
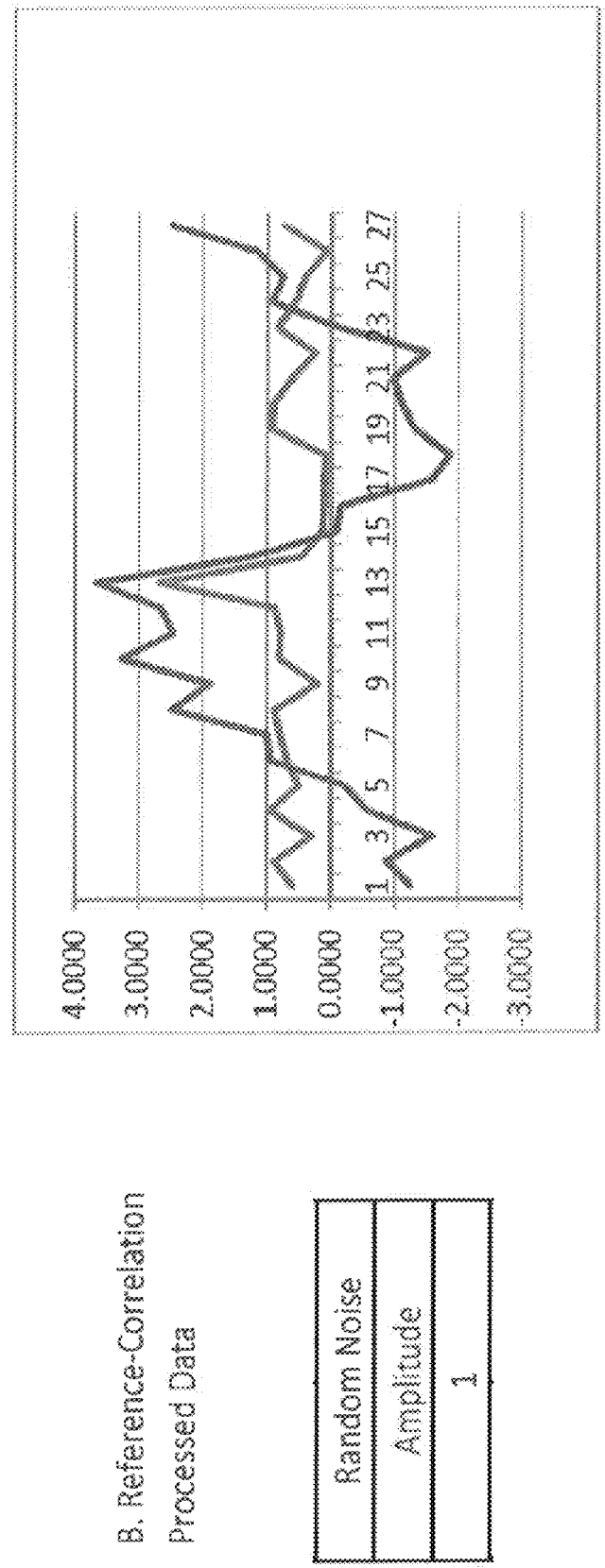
FIG. 7B shows typical Reference and Correlation Data.

FIG. 7B shows Typical Reference and Correlation Data. This figure shows the actual Reference and Correlation data values presented for Correlation under the same S/N conditions as in FIG. 7A, above.

FIG. 7C shows Typical Processed Correlation Results Showing a Correlation Match. This figure shows the output of the Correlation Detector under the same S/N conditions as in FIGS. 7A and 7B above. The significant Peak at position 6 correctly signifies the arrival of Data created at the Reference Site which has arrived at the downstream Correlation Site.

FIG. 8 shows a Relationship between Object Location and Path Reflection Arrival Time. This figure shows the projected arrival time of reflections from Objects in the AE Path of FIG. 6, which arrive at Transducer C, E and G (Series 3), or at Transducers B and H (Series 2), and at Transducers D and F, (Series 4). By sequentially transmitting from the next Transducer (A to H), the physical location of any Object can be conclusively determined, and tracked as the Object moves downstream.

Figure 9:
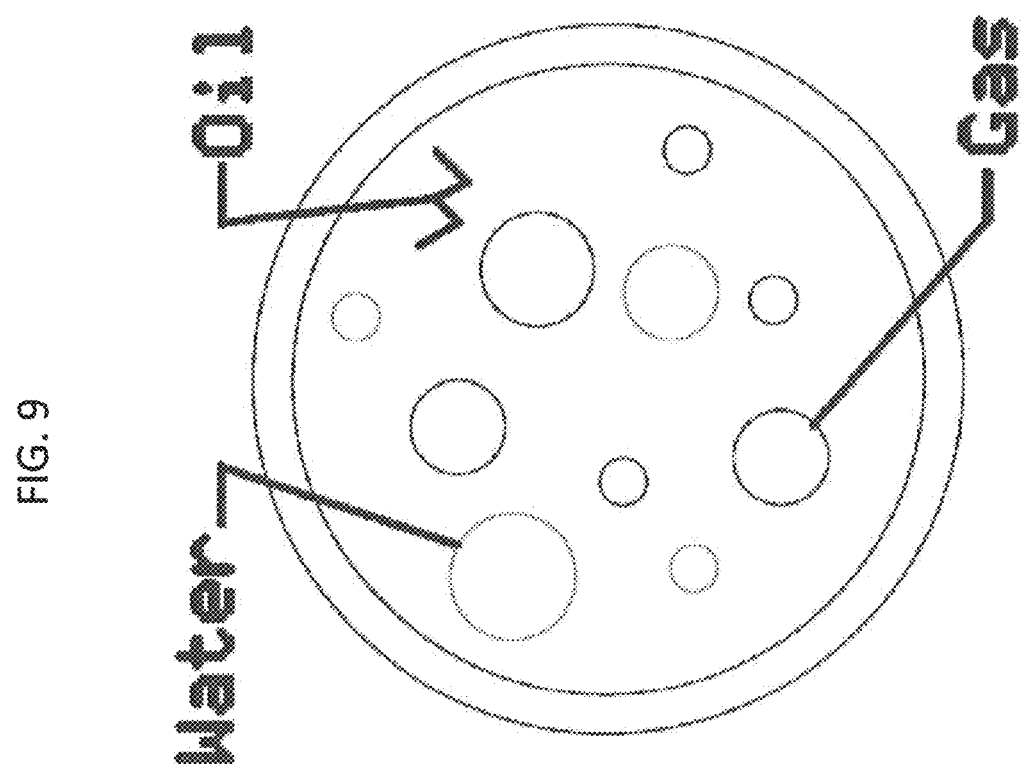
FIG. 9 shows a typical Multiphase Object Size and Distribution.

FIG. 9 shows a Typical Multiphase Object Size and Distribution. This figure typifies the distribution of Oil and Gas Objects in flowing Crude Oil at a particular location and time.

FIG. 10 shows a Typical Flow Profile and Object Pattern Stabilizer Construction. In applications in which there is a high degree of mixing taking place between the Reference and Correlation Sites it may be necessary to control the displacement of Objects as they travel downstream so as to maintain the strength of the Correlation computation. Placement of Flow Profile Conditions of either 7 or 19 tubes whose length fits just between the Reference and Correlation Sites serves to maintain correlatable Object locations permitting correct flow rate computation.

a. Overall Holographic Multiphase Flowmeter (HMF) Construction

The HMF instrument provides an appropriate number of Clamp-On Transducer pairs (dependent on pipe size) which are secured by a Mounting Track to the exterior of a pipe or container in the field, or already installed as a pretested and calibrated Spool. A Flow Computer controls the transmission of ultrasound, and analyzes the signals received by the transducers. Digital data is provided in real time indicating Flow Rate, Multiphase component type and relative percentage, plus, if desired, graphic data permitting display of the changing size, type and location of the Objects composing the Multiphase fluid.

b. HMF Transducer

All HMF transducers are Clamp-On, as shown in FIG. 1, Clamp-On Multiphase Transducer. They inject sonic energy normally into the pipe or container wall, which may be either plastic or metal, and of any wall thickness. Acting as Transceivers, they may periodically serve as Transmitters or Receivers, as controlled by the Flow Computer. They are sized dependent on the pipe diameter range into which a particular application falls, each of which may operate at a proportionally appropriate frequency, typically in the range from 100 kHz to 3 mHz.

c. HMF Mounting Track

FIG. 2, Clamp-On Multiphase Mounting Track, shows the HMF Mounting Track, with both Reference and Correlation Transducers already installed at the controlled distance between them desired for computation of flow rate. All HMF require a pair of such mounting tracks and transducer sets installed on the pipe or container in diametrically opposite positions, a minimum of four and as many as needed to provide sufficient coverage of the pipe or container interior. Typical numbers would be 4 for a 1 inch pipe, and 8 for a 4 inch pipe.

As may be seen on FIG. 2, all mounting tracks are aligned by use of two mounting straps. All transducers install within the body of the Mounting Track to assure protection from the elements in the field. A clamping screw in the Mounting Track applied downward pressure on the Transducers to secure them on the pipe. The use of a common pair of straps insures that the Mounting tracks are aligned so that all Transducers "see" the same Objects simultaneously.

A unique feature of the Mounting Track is that the entire Flow Computer circuit can be configured to install in any one Mounting Track, or be distributed so that the transmit and amplifier circuits can be mounted on each Track adjacent to their respective Transducers, with one Track acting as the Memory and Computation Control center. This permits transfer of only digitized Transducer signals to be sent to a central computation center and eliminates the need to use noise pickup cables to transmit low level Transducer receive signals from the Transducers to a central Flow Computer 106. By potting all such low voltage circuits the resultant packaging can meet international safety standards.

In applications which do not require the measurement of Flow Rate, only the Reference transducers are required, allowing the reduction in the number of transducers required, (Reference only), and use of a much shorter mounting track.

d. HMF Transducer Mounting Configuration

As shown in FIG. 3, Clamp-On Multiphase Transducer Array, a typical installation on a 4" pipe, either field installed Clamp-On transducers, or supplied as a Spool, shows 8 mounting tracks surrounding the interior of the pipe. This provides full coverage. However, even in such an application full function and excellent performance can be provided by use of only 4, rather than 8 mounting track assemblies.

d. HMF Block Diagram

As shown, on FIG. 4, the HMF Multiphase Block Diagram, each transducer is connected to a Transmit Generator, and to its individual amplifier. Only one of the transducers is operated as a Transmitter at any given time, with the remainder acting as Receivers. Thus, at any given transmit event, the sonic energy transmitted is received directly from the Transmitters opposite number, while all the other receive reflected sonic energy from Objects which lie in the Direct Beam Path. By "rotating" the selection of which transducer acts as Transmitter, full coverage of the pipe or containers interior is effected. In a typical 4" pipe each Transmit/Receive cycle takes only 100 microseconds, allowing a full scan of all 8 paths in less than 1 millisecond.

Time is marked and recorded as precision clock pulses following each Transmit event. The receive Reference Transducer's outputs (in the form of an amplitude modulated sine waves corresponding to the Reflection pattern) are amplified and converted to high resolution Digital data. This time stamped data is stored in FIFO memory in such a way that each individual report can be compared path for path with data subsequently obtained from the Correlation transducers for computation of flow rate. Also stored in synchronism with such data is any needed operational condition data, such as amplifier gain, needed for proper Correlation computation. When a correlation event is confirmed, stored data may be erased and replaced, except data needed for other purposes, such as Object type, size and location information, and then needed to support any required Object imaging.

e. HMF Flow Computer

From the block diagram shown above, the concept of the HMF leads to very simple electronic structure, other than those associated with output functions and protocols which may require specific output circuits. Consequently, it is anticipated that the entire circuit may be condensed and fully potted for inclusion within the structure of one of the HMF Mounting Tracks, in a structure that meets all regulatory requirements, as shown in FIG. 4., the very low power requirements of the HMF permit operating power to be delivered at very low voltage, well within levels that permit the HMF to be rated as Intrinsically Safe. Potentially, local Transmit, Receive, A/D and Memory functions can be locally installed on each Mounting Track, with only digital commands and data transferred to the main processor.

4. HMF Operation Algorithms

The HMF operation is controlled by the following algorithms:

a. Collection of Path Data

As shown, in FIG. 3, the Multiphase transducers surround a pipe, or container, so that a sonic beam emitted by each of them, in turn, will illuminate the entire interior of the pipe. Since this takes only 1 millisecond in the exemplary case, it is apparent that the entire cross section of a pipe is examined 1000 times per second at the location of the Reference transducers. In relation to normal medium flow rates, this is at a sufficiently high rate to suggest that all Multiphase conditions are essentially continuously examined.

FIG. 6, Sonic Beam Signature Generation, shows the internal Direct and Reflect Paths that will develop internal to the Clamp-On transducers positioned in accordance with FIG. 3. As shown in FIG. 6, a sonic beam emitted from Site A, which encounters Objects R1 and R2 in its Path to the diametrically opposite Site E, will cause possible reflections to Sites B, C, D, F, G and H, plus the Direct signal to Site e. Accordingly, every time that a Transmit pulse is emitted from Site A, (or any other Site which at that time is Transmitting), both Direct and Reflect signals are possible at the angularly located Transducers related similarly to those identified above.

Since the Direct and Reflect signals are basically amplitude modulated sine waves of the frequency of the Transmit transducer, it is necessary to digitize this signal. This is done by conventional A/D converters, using a clock frequency of at least twice the frequency of the Transmit pulse train. Once digitized, it would be realistic to use a rolling average to condense the digital data into about 100 bytes covering the time duration of a Path, which in the case of a 4" pipe will approximate 100 microseconds. Accordingly in this case, a resultant output of one byte per microsecond will suffice, at a higher rate for smaller pipes and lower for larger pipes to maintain an Object resolution of 1 percent independent of pipe size. Alternatively, A/D activation can be instituted at time periods of around 1% of the time needed for an ultrasonic pulse to travel to its Direct Receiver Transducer.

Thus, all data can be stored in an individual Path FIFO with a new Path entry, in this case, every 100 microseconds. The length of the FIFO need only be long enough for all data functions to be complete, or for stored data to be extracted for use as may be required for other computations. The data must be tagged with the real time of entry, the Path ID and the related operational information, such as amplifier gain control.

While the basic data to be recorded is that of a Path, such as A-E, or D-H, etc., it is also possible to combine the data for all Paths, transmitting sequentially or otherwise for all Sites from A to H, into a new basic entity called a Scan. While the individual Path data is of the highest resolution, the Scan data is most representative of the condition then existent in the entire cross section of the pipe. And a group of Scan data, the number dependent on flow rate, will represent all Signatures developed during the time taken for an Object to cross the Sonic Beam diameter. Many other combinations of Path and Scan data are possible, and experience will dictate which selection permits the most robust Correlation in any particular class of application.

b. Processing and Memorization of Path Data

Note that the Reflections from Gas, as noted previously, are much larger than from Oil in Water, or Water in Oil, an active Gain Control must be used to prevent amplifier saturation. Therefore it is necessary to utilize the recorded Gain Control of the amplifiers to reconstruct the correct signal amplitude for correlation when and if Flow measurement is desired, or for liquid type identification. It is also possible to convert all digital data to a summary of the Center of Energy of each peak, and its arrival time, to be used for correlation as well as for Multiphase Object type, size and location purposes.

i. Correlation for Flow Rate Computation

The use of a Correlation routine to facilitate the measurement of flow is simple in principal. Merely obtain data at one site that represents a physical state of the medium at a Reference Site, Objects, and then, depending on the stability of that Reference condition as the medium flows a known distance downstream to a Correlation Site, measure the time taken for the Objects to travel that distance. Flow Rate=Distance/Time.

The Correlation routine needs to allow for a certain amount of distortion in the relative position of the Objects, as well as non-common mode noise to corrupt the Correlation signal. It is also necessary to recognize that a smaller Reference sample is likely to be more unique than the average of a number of Reference samples, as ultimately, in the bulk the average distribution of Objects will be relatively consistent over longer periods of time, making precise time correlation more difficult.

Examination of the parameters of a representative case will allow judgment to be used to select among various correlation routines. Typically, a correlation routine, such as that by Pearson, would be highly successful, and can be enhanced by including weighting by relative signal amplitude levels and by voting among correlation coefficients computed from different combinations of Path and Scan data.

Assume a pipe diameter of 4" and a flow velocity range of 1'/sec to 40'/sec, and a sonic beam diameter of 1". Also assume a Path data period of 100 usec, and a Scan rate of about 1 kHz. Then assume an A/D clock frequency of 1 MHz, providing 100 bytes per Path, or 800 per Scan for an 8 Path system. Also, assume 1 foot as the distance between the Reference and the Correlation sites.

At a flow velocity of 1'/sec, an object takes approximately 100 milliseconds to traverse the 1" beam width, during which there will be 100 Scans, or 800 Paths, providing 80,000 bytes of information. It takes almost 1 second for an Object to travel from the Reference to the Correlation site, during which almost 1 million bytes would need to be stored. An object travels only around 0.01" in one Scan period, or around 0.001 inches per Path.

At a maximum flow rate of 40'/sec, it takes only around 2 milliseconds for an Object to traverse the 1" beam, during which there will be only 2 Scans, or 16 Paths, providing only 1600 bytes of information. It takes only 25 msec for an Object to travel from the Reference to the Correlation site, during which only 20,000 bytes of information need be stored. An object travels as much as 0.016 inches in one Scan period, or $\frac{1}{60}^{th}$ of the distance across the beam.

Regardless of the diameter of the pipe or container, identification of the size of Objects would only require a resolution of, say, 1 percent. In the case of a 4" pipe, with a traverse time of 100 usec, a clock frequency of 1 mHz would be sufficient. If a clock pulse of 5 MHz were used, it would be possible to use a 5 cycle running average to get a minimal correlation sample size of 100 Bytes.

For practical purposes, it is only necessary to measure instantaneous flow rate every 0.1 seconds, and that only for Control purposes, where high response rate might be important. Accordingly, a Best Method would perform correlation 10 times per second, and do so on one or all three of the proposed methods:

a. On a Continuous Like Path Basis (100 Bytes)
b. On a Continuous Synchronized Path Basis (800 Bytes)
c. On a Selected Like Path Basis (100 Bytes)
d. On a Selected Synchronized Scan Basis (800 Bytes)
e. On an "n" Summed Synchronous Scan Basis (n×800 Bytes)

The selected Reference Data is memorized and the Correlation data is continually scanned until a Match is declared by the Best Correlation selection method, and then the process is either restarted or replaced. It is preferred to exclude data obtained by Direct transmission, and correlating only on Reflect data, and separately correlating on Direct data, using a voting system to make a final Match selection.

Where Continuous methods are used, each Correlation equation's computation strength is recorded and the trends are analyzed to determine the best strength, and then taking its time signature for flow rate computation. It is likely that amplification of the peak values of the Reference and Correlation data, or exclusion of minimum data values will enhance the correlation strength, effectively performing correlation on the more dominant Objects.

An exemplary indication of the Correlation process is shown in FIG. 7A-C. Typical Reference and Correlation Data, A long data string of random Reference numbers of amplitude magnitude "1" had a Single Peak of amplitude 2 inserted at position 6. A range of Correlation numbers from that random string "N=15" bytes long was then correlated against the Reference data, sliding the data by 1 Path data report each time a correlation was sought. To make the correlation as difficult as possible, a random string of magnitude "1" and a second low frequency Sine wave of Magnitude 2 were first added to the Correlation (not the Reference) data.

FIG. 7A shows the comparison of the raw Reference and Correlation data. Clearly no identification of Position 6 is possible. FIG. 7B clearly shows that the Reference and Correlation data are very different, which clearly shows the corruption of the random and sinusoidal noise added to the Correlation data. Again, this processed data is does not reveal that Position 6 would correlate.

But, after processing this latter data via the Correlation Equation, FIG. 7C clearly identifies that Position 6 is the Best Correlation. Its correlation strength of 0.47 is excellent, especially as the Signal to Noise ratio is only 0.67, much less than would be expected in actual operation with multiple peaks on which to correlate.

ii. Object Type Identification

The same data as used for Correlation serves an additional purpose. Note that peak values in the Path data reveal an Object which caused a Reflection. When successive Path or Scans reveal the presence of the same Object, the relative peak amplitude reached before that Object disappears is a determinate of the type of Object causing the reflection. An Object which is a bubble of Gas will cause substantially higher reflection amplitude than a bubble of water in oil, or oil in water. Since the Primary liquid is definable by the measured Vs of the Direct wave, it is readily apparent which liquid is the bubble.

iii. Object Location

Note that the data used for Correlation can also be used to show how much time it took, after Transmission, for any Reflection Peak to reach any Transducer. FIG. 7A, Object Location by Path/Arrival Time Correlation, shows that that time is also a measure of distance, since Vs has been measured by the Direct beam. Accordingly, the location of any Object in the Direct beam can be readily computed, totally defining the location of any Object in real time.

It should be noted that a comparison of successive Scan data for the period of time needed for an Object to cross the Sonic Beam at the Reference location can be compared to similar data showing the same Objects at the Correlation site. Subtracting the Reference data from the Correlation data will show a comparative advancement in relative location of the Central Objects, compared to the Peripheral Objects revealing any higher central velocity. This permits computation of the shape of flow profile and compensation for any errors that flow profile might otherwise cause.

iv. Object Size Identification

Again, the same data used for correlation and for Multiphase liquid or gas determination is used to determine the size of any Object. First, a large object will usually reflect sonic energy to more than one Receive transducer. The arrival times at each of these Receiver transducers will define the closest point of the object to each transducer, in itself permitting computation of Object's diameter.

But, in addition, the persistence of the Object being seen on successive Scans is a measure of the size of the Object since the velocity of flow is also being measured, which together with the duration time of its detection is a measure of size. i.e., Length of Object=duration time×flow velocity. Combining the Length with the diametric measurement actually shows the approximate shape of the Object.

v. Display of Multiphase Content

Often visualization of process conditions is more useful to operating personnel than numerical descriptions. Accordingly, since Type, Location and Size of all Objects are computed, as above, on a real time basis, it is possible to display this information. It can be shown, as in FIG. 9, Multiphase Content Display, as a dynamically changing image of the cross section of the pipe at the location of the Reference transducer.

It is also possible to retain such data for a period of time to construct a 3D image of the movement of the Multiphase medium over a defined length of pipe. And finally, the data can be displayed graphically, as either a bar or line chart.

vi. Automatic Control

All computed Multiphase Object Type, Size and Position data can be output in digital or analog form as may be convenient for automatic control of operating conditions needed to optimize any of these parameters as may be permitted by the operating equipment, such as mixers or pumps.

5. Enhanced HMF Correlation

Multiphase conditions are highly variable, with no clear definition of its limits. Certain applications will present conditions that may approximate that of Single Phase operation. In such cases, low viscosity and high flow rate conditions may serve to disperse those few Objects that may exist. As dispersion occurs it will be more difficult to perform correlation as the Objects may be in totally different physical positions at the Correlation site from where they were at the site.

In such cases, and only when supplied as a Spool, the HMF can be equipped with a form of flow conditioner that will serve to extend the range of HMF operation towards the Single phase range.

As shown in FIG. 10, Insert Spool Signature Stabilizer, embedding a 7 or 19 tube bundle (choice dependent on Spool diameter), whose length extends from just past the Reference site and ends just before the Correlation site, will serve to stabilize the relative position of all Objects, much improving the physical position stability of all Objects.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the disclosure.

What is claimed is:

1. An ultrasonic flowmeter comprising:
an assembly comprising:
a first ultrasonic transducer disposed at a first position along circumference on an outside surface of a container wall;
a second ultrasonic transducer disposed at a second position along the circumference opposite the first position;
a third ultrasonic transducer disposed at a third position along the circumference different from the first and second positions;
a fourth ultrasonic transducer disposed at a fourth position along the circumference opposite the third position; and
a controller configured to perform a scan by sequentially activating each corresponding one of the ultrasonic transducers to act as a transmitter of an ultrasonic signal, and during each activation, sequentially reading from each of the non-activated transducers acting as receivers, to obtain first scan data including data received from each of the non-activated transducers, and wherein the controller determines an object from the obtained first scan data.

2. The ultrasonic flowmeter of claim 1, wherein the flowmeter has a clamp-on ultrasonic transducer structure.

3. The ultrasonic flowmeter of claim 2, wherein the transmitter injects the ultrasonic signal normally through the container wall that travels diametrically and causes ultrasonic reflections from objects in a path of the ultrasonic signal that differs in sonic impedance from a primary medium in the container.

4. The ultrasonic flowmeter of claim 3, wherein the primary medium is oil and the object is a bubble of water or gas.

5. The ultrasonic flowmeter of claim 1, wherein the controller comprises a gain controlled amplifier and an analog to digital converter (A/D) for each transducer, and a memory for storing the first scan data.

6. The ultrasonic flowmeter of claim 1, wherein the first scan data includes ultrasonic signal amplitudes.

7. The ultrasonic flowmeter of claim 6, wherein the controller interprets the amplitudes against reference amplitudes to determine a composition of the object.

8. The ultrasonic flowmeter of claim 7, wherein the composition indicates percentages of oil, gas, and water.

9. The ultrasonic flowmeter of claim 1, wherein the controller uses the first scan data to determine a location of the object.

10. The ultrasonic flowmeter of claim 3, controller determines the location of the object within the container from arrival times of the ultrasonic reflections.

11. The ultrasonic flowmeter of claim 1, wherein the controller uses the first scan data to determine a size of the object.

12. The ultrasonic flowmeter of claim 1, wherein the controller is configured to construct a fixed plane or a three-dimensional image of the object from the first scan data.

13. The ultrasonic flowmeter of claim 3, wherein the assembly is duplicated and located a known distance downstream from a reference location on the container.

14. The ultrasonic flowmeter of claim 13, wherein the controller determines, by correlation, of the first scan data to second scan data collected at the downstream assembly, a time taken for the object to arrive at the downstream assembly, and calculates a flow rate by dividing the distance by the time.

15. The ultrasonic flowmeter of claim 13, further comprising tubular stabilizers disposed within the container.

16. The ultrasonic flowmeter of claim 3, wherein the controller is configured to determine a flow profile analysis by comparison of the object at a central location within the pipe with an average object location.

17. The ultrasonic flowmeter of claim 14, wherein the correlation first uses reflect data among the scan data, and then uses direct transmission data among the scan data.

18. The ultrasonic flowmeter of claim 14, wherein the correlation is strengthened by enhancing higher valued reflect data among the scan data relative to lower valued reflect data among the scan data.

19. The ultrasonic flowmeter of claim 14, wherein the correlation is strengthened by using absolute amplitude data among the scan data as a multiplier of correlation strength to determine a best match.

20. The ultrasonic flowmeter of claim 14, wherein the scan data includes data from a plurality of direct and reflection paths of the ultrasonic signal, and the correlation selects a best correlation by a voting system among the paths.

21. The ultrasonic flowmeter of claim 1, wherein each ultrasonic transducer is a piezoelectric crystal or ceramic.

22. The ultrasonic flowmeter of claim 13, wherein the clamp-on structure comprises a pair of metal straps configured to secure the assemblies around the container.

23. The ultrasonic flowmeter of claim 22, further comprising a tensioner configured to apply tension to enable the straps to be tightened around the container.

24. The ultrasonic flowmeter of claim 1, wherein the scan is performed multiple times to enable the controller to determine a percentage of each constituent component in the object as it changes over time.

* * * * *